United States Patent
DeLuca et al.

(10) Patent No.: US 11,240,189 B2
(45) Date of Patent: Feb. 1, 2022

(54) BIOMETRIC-BASED SENTIMENT MANAGEMENT IN A SOCIAL NETWORKING ENVIRONMENT

(71) Applicant: International Business Machines Corporation, Armonk, NY (US)

(72) Inventors: Lisa Seacat DeLuca, Baltimore, MD (US); Asima Silva, Holden, MA (US)

(73) Assignee: International Business Machines Corporation, Armonk, NY (US)

( * ) Notice: Subject to any disclaimer, the term of this patent is extended or adjusted under 35 U.S.C. 154(b) by 255 days.

(21) Appl. No.: 15/294,673

(22) Filed: Oct. 14, 2016

(65) Prior Publication Data

US 2018/0109482 A1    Apr. 19, 2018

(51) Int. Cl.
| | |
|---|---|
| H04L 29/08 | (2006.01) |
| H04L 12/58 | (2006.01) |
| G06Q 50/00 | (2012.01) |
| G06N 20/00 | (2019.01) |

(52) U.S. Cl.
CPC ............ *H04L 51/32* (2013.01); *G06N 20/00* (2019.01); *G06Q 50/01* (2013.01); *H04L 51/08* (2013.01); *H04L 67/22* (2013.01); *H04L 67/18* (2013.01)

(58) Field of Classification Search
CPC ........................................................ H04L 51/32
See application file for complete search history.

(56) References Cited

U.S. PATENT DOCUMENTS

| | | | |
|---|---|---|---|
| 7,346,779 B2 | 3/2008 | Leeper | |
| 7,873,516 B2 | 1/2011 | Childress et al. | |
| 8,005,776 B2 | 8/2011 | Fithian et al. | |
| 8,170,872 B2 | 5/2012 | Lyle | |
| 8,239,774 B2 | 8/2012 | Gandhi et al. | |
| 8,346,779 B2 | 1/2013 | Gelbard | |
| 8,863,243 B1* | 10/2014 | Lidzborski | G06F 21/316 709/245 |
| 9,076,125 B2 | 7/2015 | Manolescu et al. | |
| 2005/0163379 A1 | 7/2005 | Zimmerman | |
| 2010/0082751 A1* | 4/2010 | Meijer | G06F 15/16 709/206 |

(Continued)

OTHER PUBLICATIONS

Borromeo et al.; "Automatic vs. Crowdsource Sentiment Analysis", IDEA'15 ACM Proceedings of the 9th International Symposium on, Jul. 13-15, 2015, pp. 90-95.

(Continued)

*Primary Examiner* — Ario Etienne
*Assistant Examiner* — Sm Z Islam
(74) *Attorney, Agent, or Firm* — L. Jeffrey Kelly

(57) ABSTRACT

Disclosed aspects relate to biometric-based sentiment management in a social networking environment. A set of biometric data for an originating-user of an electronic message may be detected using a set of biometric sensors. Based on the set of biometric data, an originating-user sentiment for at least a portion of the electronic message may be determined. The electronic message and the originating-user sentiment for at least the portion of the electronic message may be compiled to establish a compiled message. The compiled message which indicates the originating-user sentiment for at least the portion of the electronic message may be provided in the social networking environment.

19 Claims, 5 Drawing Sheets

(56) References Cited

U.S. PATENT DOCUMENTS

| | | | |
|---|---|---|---|
| 2010/0257117 A1* | 10/2010 | Shvadron | G06F 16/313 |
| | | | 705/36 R |
| 2012/0278064 A1 | 11/2012 | Leary et al. | |
| 2013/0018894 A1 | 1/2013 | Qiao | |
| 2013/0085758 A1* | 4/2013 | Csoma | G16H 50/20 |
| | | | 704/260 |
| 2013/0297546 A1 | 11/2013 | Woods-Holder | |
| 2014/0171752 A1* | 6/2014 | Park | A61B 5/165 |
| | | | 600/301 |
| 2014/0236596 A1* | 8/2014 | Martinez | G06F 17/2785 |
| | | | 704/235 |
| 2015/0150032 A1 | 5/2015 | Birnkrant | |
| 2015/0222586 A1* | 8/2015 | Ebersman | G06F 3/04817 |
| | | | 715/752 |
| 2015/0332088 A1 | 11/2015 | Chembula | |
| 2016/0004299 A1* | 1/2016 | Meyer | G06F 3/011 |
| | | | 715/706 |
| 2016/0063210 A1* | 3/2016 | Bardi | G06Q 50/22 |
| | | | 705/2 |
| 2016/0117937 A1* | 4/2016 | Penders | G09B 5/00 |
| | | | 434/236 |
| 2016/0154959 A1* | 6/2016 | Chin | H04L 51/10 |
| | | | 726/22 |
| 2016/0179967 A1* | 6/2016 | Sa | G06F 16/3346 |
| | | | 707/730 |
| 2017/0337274 A1* | 11/2017 | Ly | G06Q 10/107 |
| 2017/0365101 A1* | 12/2017 | Samec | A61B 5/4088 |
| 2018/0077095 A1* | 3/2018 | Deyle | G10L 25/63 |

OTHER PUBLICATIONS

Tang et al.; "Sentiment Embeddings With Applications to Sentiment Analysis", IEEE Transactions on Knowledge and Data Engineering, vol. 28, No. 2, Feb. 2016, pp. 496-509.

Parallax Inc Forum; "Project Idea-Heart Rate Monitor which sends emergency text message w/ GPS coor"; <http://forums.parallax.com/discussion/118230/project-idea-heart-rate-monitor-which-sends-emergency-text-message-w-gps-coor>.

Grimes, Seth; "Sentiment Analysis Innovation Sources"; Breakthrough Analysis; <https://breakthroughanalysis.com/2014/02/21/sentiment-analysis-innovation/>; Feb. 21, 2014.

\* cited by examiner

BIOMETRIC-BASED SENTIMENT MANAGEMENT IN A SOCIAL NETWORKING ENVIRONMENT

BACKGROUND

This disclosure relates generally to computer systems and, more particularly, relates to biometric-based sentiment management in a social networking environment. Social network environments may be used to facilitate message communication and sentiment expression between users. The amount of information communicated using social networking environments is increasing. As the amount of information communicated using social networking environments increases, the need for sentiment management may also increase.

SUMMARY

Aspects of the disclosure relate to biometric-based sentiment management in a social networking environment. Biometrics may be used to dynamically assess the sentiment of a user and attach an indication of the sentiment to a communication. Biometric assessment may be performed using machine-learning techniques that are configured for a specific user. An indication of the sentiment of the user may be determined based on the biometric assessment and applied to a communication. If a trusted relationship exists between a sender and a receiver of the communication, the biometric-based sentiment assessment for the sender of the communication may be configured to be accessible to the receiver of the communication.

Disclosed aspects relate to biometric-based sentiment management in a social networking environment. A set of biometric data for an originating-user of an electronic message may be detected using a set of biometric sensors. Based on the set of biometric data, an originating-user sentiment for at least a portion of the electronic message may be determined. The electronic message and the originating-user sentiment for at least the portion of the electronic message may be compiled to establish a compiled message. The compiled message which indicates the originating-user sentiment for at least the portion of the electronic message may be provided in the social networking environment.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
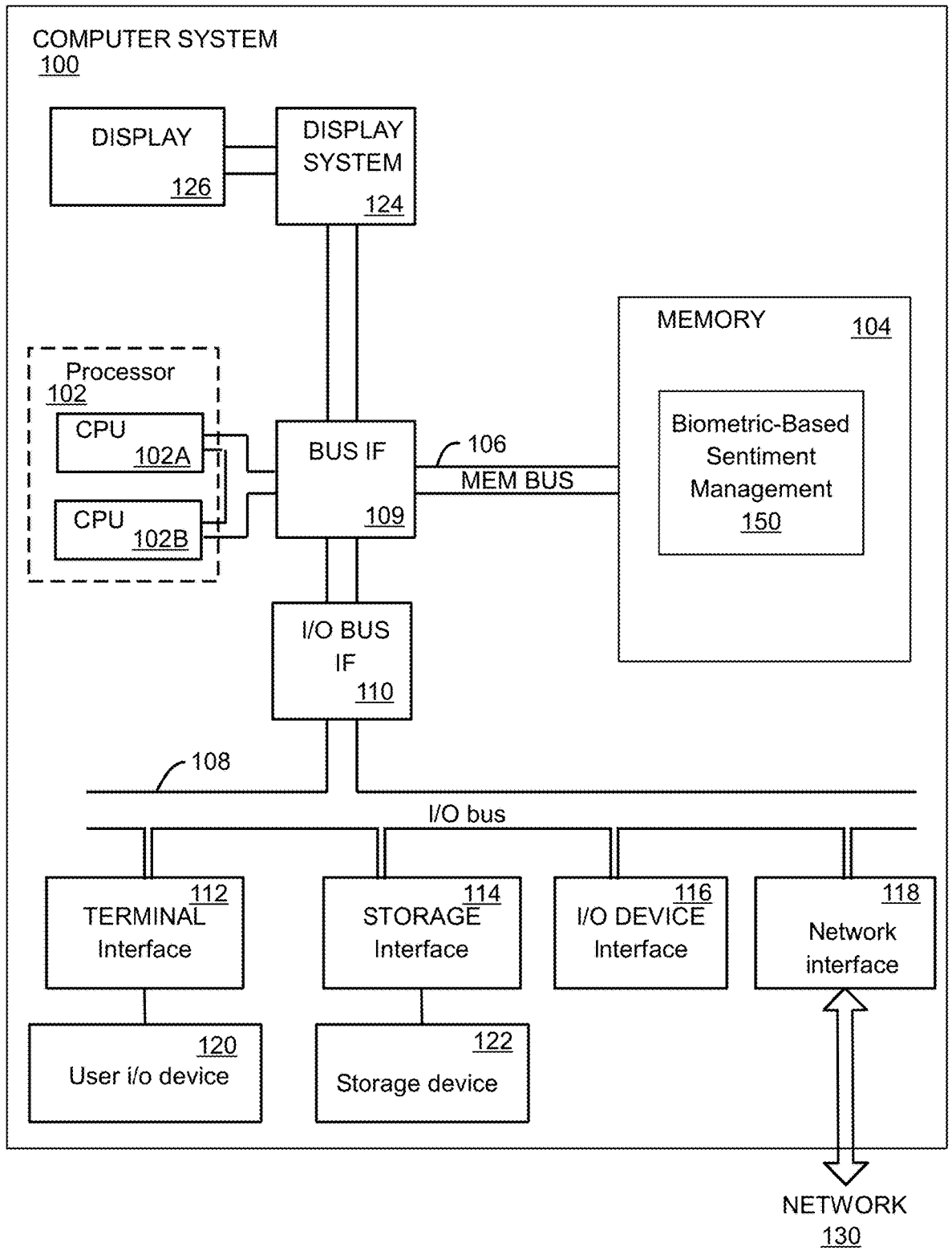
FIG. 1 depicts a high-level block diagram of a computer system for implementing various embodiments of the present disclosure, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to biometric-based sentiment management in a social networking environment. Biometrics (e.g., heart rate, body temperature, facial features, movement patterns) may be used to dynamically assess the sentiment of a user and attach an indication of the sentiment to a communication. Biometric assessment may be performed using machine-learning techniques that are configured for a specific user. An indication of the sentiment of the user (e.g., emoticon, emoji, animated gif) may be determined based on the biometric assessment and applied to a communication (e.g., textual message). If a trusted relationship (e.g., friend, family member) exists between a sender and a receiver of the communication, the biometric-based sentiment assessment for the sender of the communication may be configured to be accessible to the receiver of the communication. Leveraging biometric-based sentiment assessment for a communication may be associated with content relevance, ease of understanding, and communication reliability.

Online social networks are one tool for connecting people, sharing information, and promoting communication between users. Aspects of the disclosure relate to the recognition that, in some situations, the intent or emotion of individuals may not be clearly communicated through textual messages. For instance, different words or phrases may be unclear, leave room for (mis)interpretation, or be used to convey different meanings by different individuals. Accordingly, aspects of the disclosure relate to using biometric analysis techniques to assess the sentiment (e.g., feeling, intent, emotions, state of mind) of an individual with respect to a portion of an electronic message (e.g., text message, email, social media message). The determined sentiment of the individual may be compiled together with the content of the message and made available to recipients of the message. In this way, recipients of the electronic message may be able to more easily interpret the meaning, intent, or feeling of the originator of the message, facilitating communication clarity and transparency.

Aspects of the disclosure include a system, method, and computer program product for biometric-based sentiment management in a social networking environment. A set of biometric data for an originating-user of an electronic message may be detected using a set of biometric sensors. Based on the set of biometric data, an originating-user sentiment for at least a portion of the electronic message may be determined. The set of biometric data may be analyzed in a dynamic fashion using a biometric analysis technique to determine the originating-user sentiment. In embodiments, the set of biometric data may be analyzed using a machine-learning technique configured for the originating-user to determine the originating-user sentiment with respect to the electronic message. In embodiments, the electronic message may be analyzed using a natural language processing technique configured for the originating-user to determine the originating-user sentiment with respect to the electronic message.

Aspects of the disclosure relate to compiling the electronic message and the originating-user sentiment for at least the portion of the electronic message to establish a compiled message. In embodiments, a sentiment indicator may be attached to the electronic message in an automated fashion to establish the compiled message. An emoticon may be introduced to the compiled message in an automated fashion based on the originating-user sentiment. In embodiments, a trusted relationship which indicates a recipient access authorization for the originating user sentiment may be identified between the originating-user and a recipient user. Aspects of the disclosure relate to providing the compiled message which indicates the originating-user sentiment for at least the portion of the electronic message in a social-networking environment. Providing the compiled message in the social-networking environment may include transmitting the compiled message from the originating-user to a recipient user. Altogether, aspects of the disclosure can have performance or efficiency benefits (e.g., reliability, speed, flexibility, responsiveness, stability, high availability, resource usage, productivity). Aspects may save resources such as bandwidth, disk, processing, or memory.

Turning now to the figures, FIG. 1 depicts a high-level block diagram of a computer system for implementing various embodiments of the present disclosure, according to embodiments. The mechanisms and apparatus of the various embodiments disclosed herein apply equally to any appropriate computing system. The major components of the computer system 100 include one or more processors 102, a memory 104, a terminal interface 112, a storage interface 114, an I/O (Input/Output) device interface 116, and a network interface 118, all of which are communicatively coupled, directly or indirectly, for inter-component communication via a memory bus 106, an I/O bus 108, bus interface unit 109, and an I/O bus interface unit 110.

The computer system 100 may contain one or more general-purpose programmable central processing units (CPUs) 102A and 102B, herein generically referred to as the processor 102. In embodiments, the computer system 100 may contain multiple processors; however, in certain embodiments, the computer system 100 may alternatively be a single CPU system. Each processor 102 executes instructions stored in the memory 104 and may include one or more levels of on-board cache.

In embodiments, the memory 104 may include a random-access semiconductor memory, storage device, or storage medium (either volatile or non-volatile) for storing or encoding data and programs. In certain embodiments, the memory 104 represents the entire virtual memory of the computer system 100, and may also include the virtual memory of other computer systems coupled to the computer system 100 or connected via a network. The memory 104 can be conceptually viewed as a single monolithic entity, but in other embodiments the memory 104 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 104 may store all or a portion of the various programs, modules and data structures for processing data transfers as discussed herein. For instance, the memory 104 can store a biometric-based sentiment management application 150. In embodiments, the biometric-based sentiment management application 150 may include instructions or statements that execute on the processor 102 or instructions or statements that are interpreted by instructions or statements that execute on the processor 102 to carry out the functions as further described below. In certain embodiments, the biometric-based sentiment management application 150 is implemented in hardware via semiconductor devices, chips, logical gates, circuits, circuit cards, and/or other physical hardware devices in lieu of, or in addition to, a processor-based system. In embodiments, the biometric-based sentiment management application 150 may include data in addition to instructions or statements.

The computer system 100 may include a bus interface unit 109 to handle communications among the processor 102, the memory 104, a display system 124, and the I/O bus interface unit 110. The I/O bus interface unit 110 may be coupled with the I/O bus 108 for transferring data to and from the various I/O units. The I/O bus interface unit 110 communicates with multiple I/O interface units 112, 114, 116, and 118, which are also known as I/O processors (IOPs) or I/O adapters (IOAs), through the I/O bus 108. The display system 124 may include a display controller, a display memory, or both. The display controller may provide video, audio, or both types of data to a display device 126. The display memory may be a dedicated memory for buffering video data. The display system 124 may be coupled with a display device 126, such as a standalone display screen, computer monitor, television, or a tablet or handheld device display. In one embodiment, the display device 126 may include one or more speakers for rendering audio. Alternatively, one or more speakers for rendering audio may be coupled with an I/O interface unit. In alternate embodiments, one or more of the functions provided by the display system 124 may be on board an integrated circuit that also includes the processor 102. In addition, one or more of the functions provided by the bus interface unit 109 may be on board an integrated circuit that also includes the processor 102.

The I/O interface units support communication with a variety of storage and I/O devices. For example, the terminal interface unit 112 supports the attachment of one or more user I/O devices 120, which may include user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 120 and the computer system 100, and may receive output data via the user output devices. For example, a user interface may be presented via the user I/O device 120, such as displayed on a display device, played via a speaker, or printed via a printer.

The storage interface 114 supports the attachment of one or more disk drives or direct access storage devices 122 (which are typically rotating magnetic disk drive storage devices, although they could alternatively be other storage devices, including arrays of disk drives configured to appear as a single large storage device to a host computer, or solid-state drives, such as flash memory). In some embodiments, the storage device 122 may be implemented via any type of secondary storage device. The contents of the memory 104, or any portion thereof, may be stored to and retrieved from the storage device 122 as needed. The I/O device interface 116 provides an interface to any of various other I/O devices or devices of other types, such as printers or fax machines. The network interface 118 provides one or more communication paths from the computer system 100 to other digital devices and computer systems; these communication paths may include, e.g., one or more networks 130.

Although the computer system 100 shown in FIG. 1 illustrates a particular bus structure providing a direct communication path among the processors 102, the memory 104, the bus interface 109, the display system 124, and the I/O bus interface unit 110, in alternative embodiments the computer system 100 may include different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 110 and the I/O bus 108 are shown as single respective units, the computer system 100 may, in fact, contain multiple I/O bus interface units 110 and/or multiple I/O buses 108. While multiple I/O interface units are shown, which separate the I/O bus 108 from various communications paths running to the various I/O devices, in other embodiments, some or all of the I/O devices are connected directly to one or more system I/O buses.

In various embodiments, the computer system 100 is a multi-user mainframe computer system, a single-user system, or a server computer or similar device that has little or no direct user interface, but receives requests from other computer systems (clients). In other embodiments, the computer system 100 may be implemented as a desktop computer, portable computer, laptop or notebook computer, tablet computer, pocket computer, telephone, smart phone, or any other suitable type of electronic device.

Figure 2:
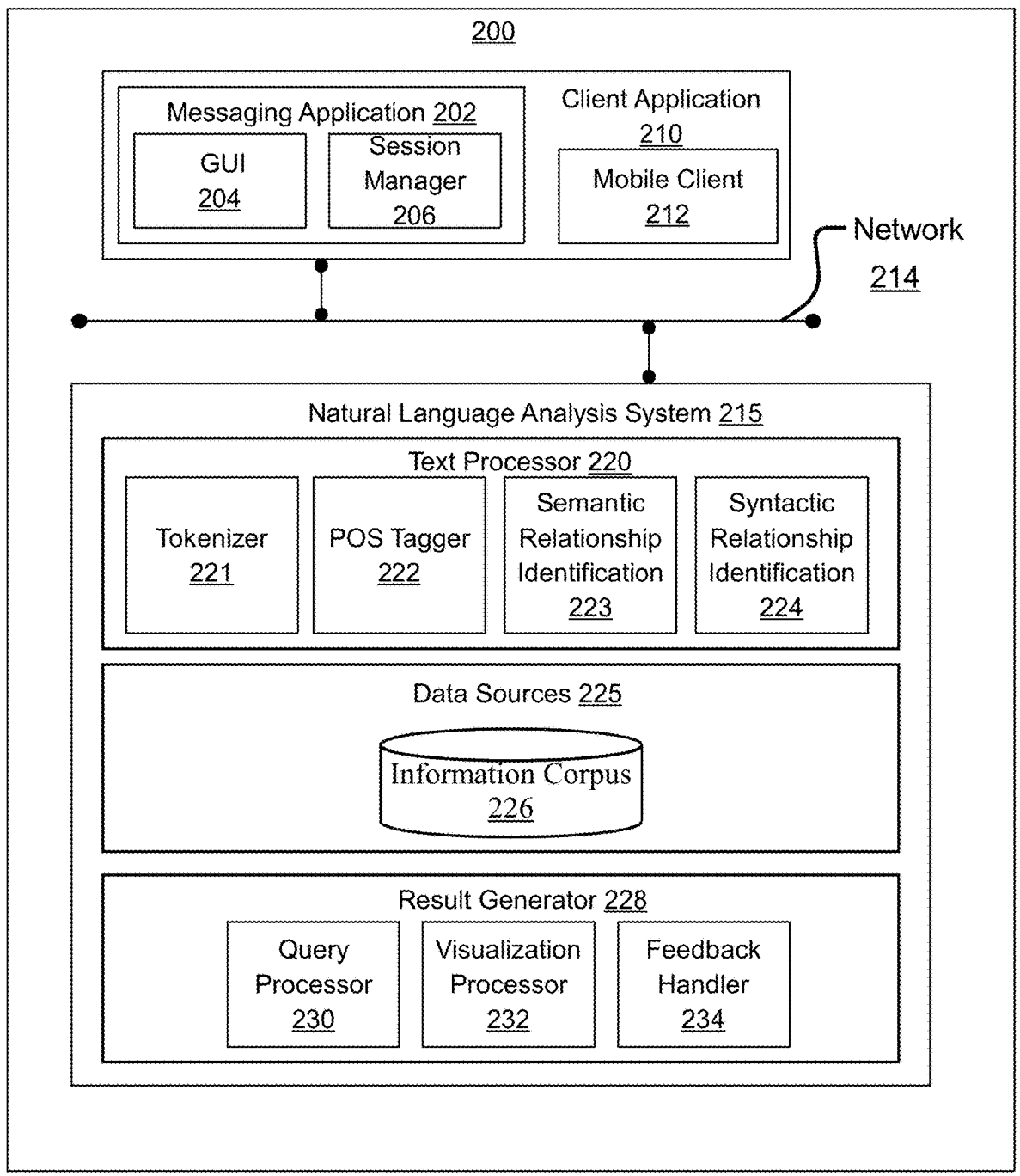
FIG. 2 is a block diagram illustrating an architecture for natural language analysis, according to embodiments.

FIG. 2 is a block diagram illustrating an architecture 200 for natural language analysis, according to embodiments. Aspects of FIG. 2 relate to performing one or more natural language processing and textual analytics operations to evaluate and interpret natural language elements (e.g., textual data, speech). In embodiments, natural language data may be collected from one or more remote devices (e.g., smartphones, tablets, laptop/desktop computers, other computing devices) by a natural language analysis system 215. The natural language analysis system 215 can perform methods and techniques for processing and interpreting the natural language data collected from the remote devices. Client applications 210 may involve one or more entities operable to generate events dispatched to natural language analysis system 215 via network 214. In certain embodiments, the events received at natural language analysis system 215 may correspond to electronic messages received from users, where the electronic messages may be expressed in a free form and in natural language.

An electronic message may be one or more words that form a phrase, sentence, paragraph, or other composition. The electronic message may include textual data, image data, video data, audio data, or other types of electronic media. Electronic messages may be composed of linguistic features including parts-of-speech, verb tenses, lexical categories, conjugations, punctuation, contractions, sentence types, and the like. In certain embodiments, the electronic message may include both restricted and unrestricted syntax for natural language expression.

In embodiments, client applications 210 can include one or more components such as a messaging application 202 and a mobile client 212. Client applications 210 can operate on a variety of devices. Such devices may include mobile and handheld devices, laptops, mobile phones, personal or enterprise digital assistants, personal computers, servers, or other computer systems configured to access the services and functionality provided by natural language analysis system 215. For example, mobile client 212 may be an application installed on a mobile or other handheld device. In embodiments, mobile client 212 may transmit electronic messages to natural language analysis system 215.

In embodiments, messaging application 202 can facilitate the composition and transmission of electronic messages to natural language analysis system 215. In certain embodiments, messaging application 202 can be a client application with respect to the natural language analysis system 215. In embodiments, messaging application 202 can transmit user-composed messages to natural language analysis system 215 for processing. Messaging application 202 may be installed on a personal computer, mobile device, server or other computer system. In certain embodiments, messaging application 202 can include a graphical user interface (GUI) 204 and session manager 206. Users may input electronic message text in GUI 204. In certain embodiments, GUI 204 may be a message composition window or other interface component to receive the input of natural language data. Users may authenticate to natural language analysis system 215 via session manager 206. In certain embodiments, session manager 206 may keep track of user activity across sessions of interaction with the natural language analysis system 215. Session manager 206 may keep track of the electronic messages that are submitted within the lifecycle of a session of a user. For example, session manager 206 may retain a succession of messages submitted by a user during a session. Information for sessions managed by session manager 206 may be shared between computer systems and devices.

In embodiments, client applications 210 and natural language analysis system 215 can be communicatively coupled through network 214 (e.g. the Internet, intranet, or other public or private computer network). In certain embodiments, natural language analysis system 215 and client applications 210 may communicate by using Hypertext Transfer Protocol (HTTP) or Representational State Transfer (REST) calls. In certain embodiments, natural language analysis system 215 may reside on a server node. Client applications 210 may establish server-client communication with natural language analysis system 215 or vice versa. In certain embodiments, the network 214 can be implemented within a cloud computing environment, or using one or more cloud computing services. Consistent with various embodiments, a cloud computing environment can include a network-based, distributed data processing system that provides one or more cloud computing services.

Consistent with various embodiments, natural language analysis system 215 may be configured to process and analyze the natural language included in electronic messages received from client applications 210. In certain embodiments, natural language analysis system 215 may include a text processor 220, data sources 225, and result generator 228. Text processor 220 can be a computer module that analyzes the received electronic messages. In certain embodiments, text processor 220 can perform various methods and techniques for analyzing the electronic messages syntactically and semantically. Text processor 220 may include various modules to perform analyses of received electronic messages. For example, text processor 220 may include a tokenizer 221, a part-of-speech (POS) tagger 222, semantic relationship identification 223, and syntactic relationship identification 224.

Consistent with various embodiments, tokenizer 221 may be a computer module that performs lexical analysis. Tokenizer 221 can convert a sequence of characters into a sequence of tokens. Tokens may be string of characters typed by a user and categorized as a meaningful symbol. Further, in certain embodiments, tokenizer 221 can identify word boundaries in an electronic message and break sentences into their component parts such as words, multiword tokens, numbers, and punctuation marks. In certain embodiments, tokenizer 221 can receive a string of characters, identify the lexemes in the string, and categorize them into tokens.

Consistent with various embodiments, POS tagger 222 can be a computer module that marks up a word in a text to correspond to a particular part of speech. POS tagger 222 can read a sentence or other text in natural language and assign a part of speech to each word or other token. POS tagger 222 can determine the part of speech to which a word corresponds based on the definition of the word and the context of the word. The context of a word may be based on its relationship with adjacent and related words in a phrase, sentence, question, or paragraph. In certain embodiments, the context of a word may be dependent on one or more previously received electronic messages. Examples of parts of speech that may be assigned to words include, but are not limited to, nouns, verbs, adjectives, adverbs, and the like. Examples of other part of speech categories that POS tagger 222 may assign include, but are not limited to, comparative or superlative adverbs, wh-adverbs, conjunctions, determiners, negative particles, possessive markers, prepositions, wh-pronouns, and the like. In certain embodiments, POS tagger 222 can tag or otherwise annotate tokens of a question with part of speech categories. In certain embodiments, POS tagger 222 can tag tokens or words of an electronic message to be parsed by other modules of natural language analysis system 215.

In embodiments, semantic relationship identification 223 may be a computer module that can identify semantic relationships of recognized entities in electronic messages composed by users. In certain embodiments, semantic relationship identification 223 may determine functional dependencies between entities, the dimension associated with a member, and other semantic relationships.

In embodiments, syntactic relationship identification 224 may be a computer module that can identify syntactic relationships in electronic messages composed of tokens posed by users to natural language analysis system 215. Syntactic relationship identification 224 can determine the grammatical structure of sentences, such as which groups of words are associated as "phrases" and which word is the subject or object of a verb. In certain embodiments, syntactic relationship identification 224 can conform to a formal grammar.

In embodiments, text processor 220 may be a computer module that can parse a received electronic message and generate a corresponding data structure for the message. For example, in response to receiving an electronic message at natural language analysis system 215, text processor 220 can output the parsed message as a data structure. In certain embodiments, the parsed question may be represented in the form of a parse tree or other graph structure. To generate the parsed message, text processor 220 may trigger computer modules 221-224. Text processor 220 can use functionality provided by computer modules 221-224 individually or in combination. Additionally, in certain embodiments, text processor 220 may use external computer systems for dedicated tasks that are part of the message parsing process.

In embodiments, the output of text processor 220 can be used by natural language analysis system 215 to associate content of the electronic message with data maintained in one or more data sources 225. In embodiments, data sources 225 may include data warehouses, information corpora, data models, and document repositories. In certain embodiments, the data sources 225 may include an information corpus 226. The information corpus 226 can enable data storage and retrieval. In certain embodiments, the information corpus 226 may be a storage mechanism that houses a standardized, consistent, clean and integrated form of data. The data may be sourced from various operational systems. Data stored in the information corpus 226 may be structured in a way to specifically address reporting and analytic requirements. In one embodiment, the information corpus 226 may be a relational database (e.g., conform to an ontology). In some example embodiments, data sources 225 may include one or more document repositories.

In certain embodiments, result generator 228 may be a computer module that generates output data structures for received electronic messages. For instance, the result generator 228 may be configured to generate associated sentiment analyses and confidence scores for one or more portions of the electronic message. Other types of results are also possible.

In embodiments, result generator 228 may include query processor 230, visualization processor 232 and feedback handler 234. When information in a data source 225 is coupled with an electronic message, a query associated with the requested data can be executed by query processor 230 to retrieve the data from the data source 225. Using the data retrieved by query processor 230, visualization processor 232 can render visualization of the retrieved data, where the visualization represents the retrieved data. In certain embodiments, visualization processor 232 may render various analytics to represent the data including, but not limited to, images, emoticons, animated gifs, charts, tables, dashboards, maps, and the like. In certain embodiments, visualization processor 332 can present the data to a user in understandable form.

In certain embodiments, feedback handler 234 can be a computer module that processes feedback from users on electronic messages processed by natural language analysis system 215. In certain embodiments, users may be engaged in dialog with the natural language analysis system 215 to evaluate the relevance, efficacy, or performance of processed messages. Result generator 228 may produce a list of candidate message results for a processed electronic message. The user may rank each answer according to its relevance, efficacy, performance, or quality. In certain embodiments, the feedback of users on processed messages may be used for future message processing sessions.

Figure 3:
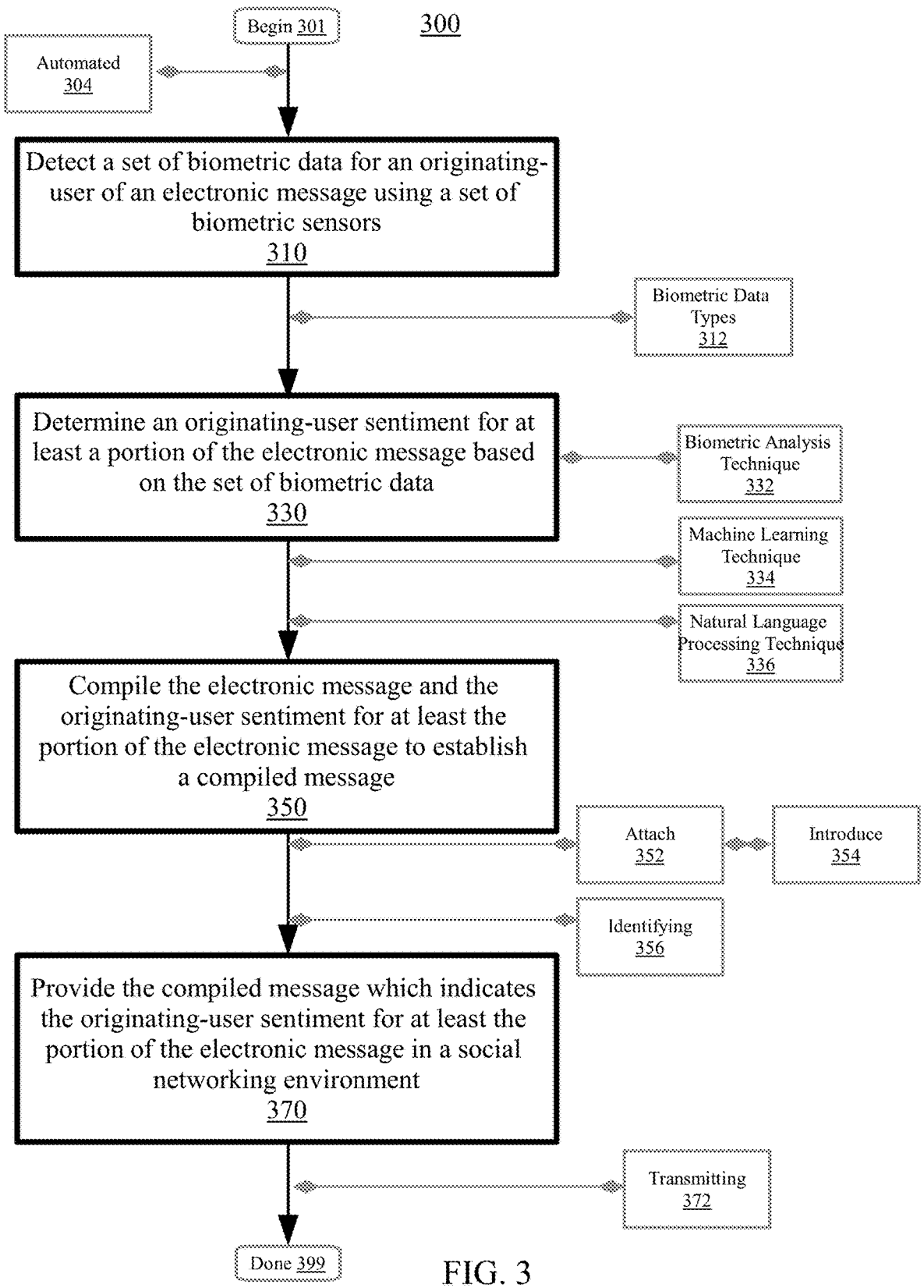
FIG. 3 is a flowchart illustrating a method for biometric-based sentiment management in a social networking environment, according to embodiments.

FIG. 3 is a flowchart illustrating a method 300 for biometric-based sentiment management in a social networking environment. Aspects of FIG. 3 relate to using biometric data (e.g., heart rate, body temperature, facial features, movement patterns) to dynamically assess the sentiment of a user and attach an indication of the sentiment to a communication. Aspects of the disclosure relate to the recognition that, in some situations, the meaning of words, phrases, or sentences of an electronic message may change based on the sentiment (e.g., emotional state, feelings) of the user who composed them. Accordingly, aspects of the disclosure relate to using biometric data for the composer of a message to assess the sentiment associated with a portion of an electronic message, and convey the sentiment to one or more other users (e.g., recipients of the electronic message).

In embodiments, aspects of the disclosure relate to applications in a social networking environment (e.g., electronic messages may be exchanged on social networks). Generally, social networking environments can include platforms that offer communication tools to facilitate the sharing of messages, information, ideas, pictures, vides, and other data between a community of users. As examples, social networking environments may include one or more of instant messaging platforms (e.g., chat service), short messaging services (e.g., text messaging), wiki databases (e.g., user maintained digital encyclopedia), social communities (e.g., micro-blog, professional connections, photo-sharing, other groups of users), newsfeeds (e.g., interface for reception and display news events and activity data), email platforms (e.g., internet or other network-based messaging tool), calendars (e.g., shared calendar platform), product reviews (e.g., collection of user reviews), project collaborations (e.g., group of users working together on a task), or the like. Leveraging biometric-based sentiment assessment for a communication may be associated with content relevance, ease of understanding, and communication reliability. The method 300 may begin at block 301.

In embodiments, the detecting, the determining, the compiling, the providing, and other steps described herein may each occur in an automated fashion without user intervention at block 304. In embodiments, the detecting, the determining, the compiling, the providing, and other steps described herein may be carried out by an internal sentiment management module maintained in a persistent storage device of a local computing device (e.g., mobile computing device of a user). In certain embodiments, the detecting, the determining, the compiling, the providing, and other steps described herein may be carried out by an external message management module hosted by a remote computing device or server (e.g., social network environment accessible via a subscription, usage-based, or other service model). In this way, aspects of sentiment management may be performed using automated computing machinery without manual action. Other methods of performing the steps described herein are also possible.

At block 310, a set of biometric data for an originating-user of an electronic message may be detected. Generally, detecting can include sensing, recognizing, discovering, identifying, ascertaining, or otherwise determining the set of biometric data for an originating-user (e.g., author, composer, originator) of an electronic message. The electronic message can include text (e.g., SMS) messages, chat messages, posts or replies submitted by users on public message boards, private exchanges between individuals, or other types of communication. As described herein, a set of biometric data may be detected for an originating-user of the electronic message. The set of biometric data may include distinctive, quantifiable (e.g., measurable) characteristics that indicate a physiological or behavioral attribute of an individual. As examples, the set of biometric data may include fingerprint data, heart rate, body temperature, iris/retina pattern, typing rhythm, gait, and vocal features. In embodiments, detecting may include using a set of biometric sensors to collect the set of biometric data. The set of biometric sensors may include a network of sensing devices including high-definition cameras (e.g., for facial feature detection), ultrasound devices (e.g., for multi-layer fingerprint detection), thermometers (e.g., for body temperature measuring), heart rate/blood pressure monitors (e.g., for cardiac data detection) and the like. In embodiments, detecting may include continuously using the set of biometric sensors to monitor one or more biological or behavioral attributes of the originating-user of the electronic message. In embodiments, detecting may include sensing a triggering event (e.g., initiation of electronic message composition, biometric above a threshold level), and beginning biometric data sensing in response to the triggering event. Other methods of detecting the set of biometric data for the originating-user of the electronic message are also possible.

Consider the following example. An originating-user may initiate an electronic message composition application (e.g., text messaging interface) on a mobile computing device (e.g., smartphone). In response to detecting user input with respect to the electronic message composition application (e.g., originating-user typing a message), the set of biometric sensors may initiate biometric data collection. As an example, in certain embodiments, the set of biometric sensors may include a fingerprint detector configured to capture a fingerprint profile of the originating-user. In embodiments, the fingerprint detector may be configured to compare the captured fingerprint profile for the originating-user with an archived fingerprint of an authorized device user (e.g., device owner) to determine whether the user currently composing the electronic message is authorized to use the device (e.g., in response to determining a match, continued message composition may be allowed, while a mismatch may be associated with device lock-down). Other methods of detecting biometric data using the set of biometric sensors are also possible.

In embodiments, the set of biometric data may include one or more types at block 312. In embodiments, the set of biometric data may include heart rate data (e.g., speed of the heartbeat, number of heart contractions per given time), blood pressure data (e.g., systemic arterial pressure, mean arterial pressure, pulse pressure, system venous pressure, pulmonary pressure), a stress score (e.g., quantifiable indication of anxiety, pressure, or tension as indicated by blood pressure, sweat pattern, and other physiological criteria), a pupil dilation (e.g., pupil size change which exceeds a threshold tolerance), or a glucose value (e.g., concentration of sugar or glucose in the blood, insulin level). In embodiments, the set of biometric data may include a body temperature (e.g., whether normothermia is achieved, thermoregulatory characteristics), movement speed (e.g., gait, walking speed, number of steps per given time), or a set of fingerprint information (e.g., impression or mark left by friction ridges of a human finger or toe). In embodiments, the set of biometric data may include a set of facial features (e.g., eye shape, eye distance from nose, nose shape, cheekbone outline) or a set of body language information (e.g., facial expressions, gestures, eye movement, use of space). Other types of biometric data (e.g., iris/retinal data, palm print, hand geometry, typing speed/rhythm, voice features) are also possible.

At block 330, an originating-user sentiment for at least a portion of the electronic message may be determined based on the set of biometric data. Generally, determining can include computing, formulating, identifying, recognizing, or otherwise ascertaining the originating-user sentiment for at least a portion of the electronic message. The originating-user sentiment may include the emotional state, attitude, state-of-mind, or other expression of the feelings or emotions of the originating-user sentiment (e.g., at the time of electronic message creation). In embodiments, the originating-user sentiment may be detected for a portion of the electronic message. Aspects of the disclosure relate to the recognition that, in some situations, originating-users may have different thoughts or feelings regarding different aspects of an electronic message. Accordingly, aspects of the disclosure relate to ascertaining the originating-user sentiment for one or more portions of the electronic message independently. In embodiments, determining may include analyzing the set of biometric data using a biometric analysis technique at block 332. Performing the biometric analysis technique may include comparing the set of biometric data collected for the user with a set of criteria, benchmark values, or biometric norms to perform an assessment of the sentiment of the originating-user. For instance, a subset of biometric data may be identified that corresponds to the time frame in which a particular portion of the electronic message was typed, and the subset of biometric data may be compared to a biometry index that includes a list of biometric elements and associated candidate sentiments (e.g., elevated heart rate may indicate anxiety or excitement, low blood sugar may indicate lethargy or lack of interest, fast walking pace may indicate eagerness or purpose) to ascertain the originating-user sentiment. In this way, the sentiment of the originating-user with respect to a portion of the electronic message may be identified. Other methods of determining the originating-user sentiment based on the set of biometric data are also possible.

In embodiments, the set of biometric data may be analyzed using a machine learning technique to determine the originating-user sentiment with respect to the electronic message at block 334. The machine learning technique may be configured for the originating-user. Generally, analyzing can include examining (e.g., performing an inspection of the set of biometric data), evaluating (e.g., generating an appraisal of the set of biometric data), resolving (e.g., ascertaining an observation/conclusion/answer with respect to the set of biometric data), parsing (e.g., deciphering structured and unstructured data constructs of the set of biometric data), querying (e.g., asking a question regarding the set of biometric data) or categorizing (e.g., organizing by a feature or element of the set of biometric data). Aspects of the disclosure relate to the recognition that, in embodiments, different biometric attributes may signify different sentiments for different users (e.g., increased blood pressure may indicate stress for a first user but excitement for a second user). Accordingly, aspects of the disclosure relate to using a machine learning technique (e.g., algorithm configured to utilize pattern recognition and computational statistics to learn and make predictions from data; association rule learning, deep learning, inductive logic programming) that is specifically configured (e.g., adapted, set-up, customized) to determine the sentiment of a particular originating-user. In embodiments, the machine learning technique may be configured to access a user profile for the originating-user that includes information regarding what biometric attributes indicate which types of sentiment for that user. The machine learning technique may be configured to utilize collected biometric and sentiment data for a user to add to the user profile and refine biometric data analysis over time (e.g., learn). As an example, over a period of time, the machine learning technique may determine that a particular user begins to pace when he/she is stressed. Accordingly, in response to detecting biometric data that indicates that a user is pacing while composing an electronic message, the machine learning technique may ascertain that the user is associated with a sentiment of "anxious, stressed." Other methods of analyzing the biometric data using the machine-learning technique configured for an originating-user are also possible.

In embodiments, the electronic message may be analyzed using a natural language processing technique to determine the originating-user sentiment with respect to the electronic message at block 336. The natural language processing technique may be configured for the originating-user. Generally, analyzing can include examining, evaluating, inspecting, parsing, querying, or investigating the electronic message using the natural language processing technique. Aspects of the disclosure relate to the recognition that, in embodiments, words, phrases, expressions, punctuation, emoticons, emojis, animated gifs, and other aspects of an electronic message may be used to mean, signify, represent, or indicate different things by different users. Accordingly, aspects of the disclosure relate to using a natural language processing technique (e.g., algorithm configured to analyze the semantic and syntactic content of natural language) that is specifically configured (e.g., adapted, set-up, customized) to determine the sentiment of a particular originating-user. In embodiments, the natural language processing technique may be configured to access a user profile for the originating-user that includes information regarding what words, phrases, expressions, punctuation, and other linguistic elements indicate what types of sentiment for that user. As described herein, the natural language processing technique may be configured to utilize collected natural language data and sentiment data for a user to add to the user profile and refine natural language analysis over time (e.g., learn). As an example, over a period of time, the natural language processing technique may ascertain that when a first user says "Fine . . . ," he/she is displeased, and is indicating resignation. Accordingly, in response to analyzing the text of an electronic message composed by the first user and detecting the phrase "Fine . . . ," the natural language processing technique may determine that a user is associated with a sentiment of "resignation, displeasure, frustration." Other methods of analyzing the electronic message using the natural language processing technique configured for an originating-user are also possible.

Consider the following example. An originating-user may compose an electronic message with the following content: "I'm still not sure about my plans for Friday yet. Tomorrow I have to go to the dentist, and if I have a cavity I'd like to make an appointment to take care of that right away on Friday morning." As describe herein, a set of biometric sensors may be used to collect a set of biometric data for the originating-user in response to sensing initiation of electronic message composition. The set of biometric data may include a recording of a series of facial expressions exhibited by the user during message creation (e.g., captured by a camera). In embodiments, the biometric data may indicate that, with respect to a period of time corresponding with creation of the phrase "I have to go to the dentist," the originating-user exhibited a wrinkled brow, contracted eyes, and a downturned mouth. As described herein, the biometric data may be compared to a biometry index, and it may be determined that the facial features exhibited by the user substantially correspond to a sentiment of "displeasure, unhappiness, unwillingness." Accordingly, the identified sentiment may be associated with the portion of the electronic message of "I have to go to the dentist" for the originating-user (e.g., indicating that the originating-user is reluctant to go to the dentist.) Other methods of determining the originating-user sentiment for a portion of the electronic message based on the set of biometric data are also possible.

At block 350, the electronic message and the originating-user sentiment for at least the portion of the electronic message may be compiled to establish a compiled message. Generally, compiling can include arranging, assembling, creating, bundling, organizing, generating, or otherwise composing the electronic message and the originating-user sentiment to establish the compiled message. Aspects of the disclosure relate to the recognition that, in embodiments, associating the originating-user sentiment together with a portion of the electronic message may be useful to convey the meaning, thoughts, or emotions of the originating-user with respect to one or more aspects of the electronic message. Accordingly, aspects of the disclosure relate to establishing a compiled message that includes both the electronic message as well as the originating-user sentiment for a portion of the electronic message. In embodiments, compiling may include gathering, collecting, or accumulating the electronic message together with the originating-user sentiment for a portion of the electronic message into a single digital bundle or package configured to be transmitted or provided to another user (e.g., recipient of the communication). In certain embodiments, compiling may include modifying (e.g., truncating, abridging, shortening, abbreviating) the content of the electronic message to only include the portion of the electronic message associated with the originating-user sentiment, and establishing the portion of the electronic message and associated sentiment together in a single data package. Other methods of compiling the established message for the electronic message and the originating-user sentiment are also possible.

In embodiments, a sentiment indicator may be attached to the electronic message in an automated fashion to establish the compiled message at block 352. Generally, attaching can include linking, associating, coupling, appending, assigning, augmenting, supplementing, or otherwise joining the sentiment indicator to the electronic message. The sentiment indicator may include a tag, marker, highlight, or other identifier to represent, signify, or otherwise express the originating-user sentiment with respect to the portion of the electronic message. In embodiments, attaching the sentiment indicator may include marking a word, phrase, or sentence of the electronic message with a sentiment tag that displays a qualitative representation of the originating-user's sentiment with respect to the marked portion of the message. For instance, the phrase "I won the lottery!!" may be marked with a sentiment tag that indicates a originating-user sentiment of "elated, thrilled" (e.g., based on biometric data including an elevated heart rate, wide eyes, broad smile). Other methods of attaching the sentiment indicator to the electronic message in an automated fashion are also possible.

In embodiments, attaching the sentiment indicator to the electronic message may include introducing an emoticon to the compiled message based on the originating-user sentiment at block 354. Generally, introducing can include inserting, adding, appending, importing, or otherwise including the emoticon to the compiled message. The emoticon may include a pictorial representation of a facial expression, feeling, or other emotion. In various embodiments, an emoji or an animated gif may be utilized (e.g., if the user is happy the giphy may be a random animated gif for the sentiment of happy instead of or along with the emoticon). In embodiments, introducing may include consulting a sentiment-emoticon database including an index of different sentiments and associated emoticons (e.g., "happy" sentiment corresponds with a smiley face, "sad" sentiment corresponds with a crying face) and ascertaining an emoticon that corresponds to the originating-user sentiment. In embodiments, the determined emoticon may be coupled with a portion of the electronic message. As an example, consider a situation in which the electronic message includes the phrase "My bike got stolen . . . " and a sentiment of "disheartened, crestfallen, unhappy" (e.g., based on biometric data including a down-turned mouth, slowed walking speed, defensive body posture). Accordingly, the sentiment associated with the electronic message may be compared with the sentiment-emoticon database, and an emoticon of an unhappy face may be determined and coupled with the electronic message. Other methods of introducing the emoticon to the electronic message based on the originating-user sentiment are also possible.

In embodiments, a trusted relationship between the originating-user and a recipient user may be identified at block 356. The trusted relationship may indicate a recipient access authorization for the originating-user sentiment. Generally, identifying can include recognizing, discovering, detecting, sensing, ascertaining, or otherwise determining the trusted relationship between the originating-user and a recipient user (e.g., receiver or intended receiver of the electronic message). Aspects of the disclosure relate to the recognition that, in embodiments, it may be desirable to limit access to sentiment data to those individuals that have an established relationship with the originating user (e.g., to maintain user privacy). Accordingly, aspects of the disclosure relate to ascertaining the existence of a trusted relationship between the originating-user and the recipient user that indicates a recipient access authorization (e.g., permission or approval) to view the originating-user sentiment. In embodiments, identifying may include accessing a list of originating-user preferences, and ascertaining that the recipient user is authorized as a trusted user. In certain embodiments, identifying may include connecting to a social network environment (e.g., specified by the originating-user) and determining that the originating-user and the recipient user are registered as "mutual friends." As another example, identifying may include consulting a public records database and ascertaining the presence of a familial connection (e.g., spouse relationship, parent-child relationship, sibling relationship) between the originating-user and the recipient user. Other methods of identifying the trusted relationship between the originating-user and the recipient user are also possible.

At block 370, the compiled message which indicates the originating-user sentiment for at least the portion of the electronic message may be provided in the social networking environment. Generally, providing can include presenting, transmitting, sending, displaying, conveying, or delivering the compiled message. As described herein, aspects of the disclosure relate to the recognition that presenting the originating-user sentiment portion together with a portion of the electronic message may be associated with message understandability, intention clarity, and communication reliability. Accordingly, aspects of the disclosure relate to providing the compiled message including both the electronic message as well as the originating-user sentiment for a portion of the electronic message. In embodiments, providing may include configuring the compiled message to display the originating-user sentiment in response to a user action (e.g., of the recipient user). For instance, the originating-user sentiment for the portion of the electronic message may initially be hidden, and become visible in response to a click, touch, tap, voice-command, or scrolling action. In embodiments, providing the originating-user sentiment may include displaying the originating-user sentiment as a highlighted portion of text, footnote of the electronic message, or a different text font than the rest of the electronic message. As an example, providing the originating-user sentiment may include highlighting a portion of the electronic message in red to indicate a sentiment of "anger" for the originating user (e.g., based on biometric data indicating increased blood pressure, elevated heart rate, increased typing speed and pressure). Other methods of providing the originating-user sentiment are also possible.

In embodiments, providing the compiled message in the social networking environment may include transmitting the compiled message from the originating-user to a recipient user at block 372. Generally, transmitting can include sending, relaying, conveying, transferring, or otherwise communicating the compiled message from the originating-user to a recipient user. In embodiments, transmitting the message can include sending the compiled message as a text message to the recipient user. For instance, transmitting the message may include using a social network-based text messaging service (e.g., instant message, private message, messenger application) to deliver the compiled message including both the electronic message and the originating-user sentiment to a mobile computing device of the recipient user. Other methods of transmitting the compiled message from the originating-user to the recipient user are also possible.

Consider the following example. An online education portal may include a virtual classroom in which an instructor and a group of students participate in synchronous educational activities (e.g., the instructor and the group of students are simultaneously logged in and engaged in the educational activities). In embodiments, the instructor and the group of students may communicate via textual chat while the instructor narrates a presentation slide. The instructor may prompt a first student of the group of students to explain a concept of the lesson to the rest of the group to test the understanding of the first student. The first student may begin typing a response to the instructor to send via the textual chat. In embodiments, a set of biometric data for the first student may be collected using a set of biometric sensors. For instance, a set of biometric data for the first student may be detected that indicates elevated heart rate, increased sweating, and restless movement. Based on the set of biometric data, sentiment for the first student may be determined. For example, in certain embodiments, the elevated heart rate, increased sweating, and restless movement may indicate a sentiment of "nervousness, uneasiness, apprehension." Using the determined sentiment for the first student and the typed response to the instructor, a compiled message may be established. The compiled message may include the content of the response typed by the first student together with the sentiment of "nervousness, uneasiness, apprehension," determined for the first student. For instance, the sentiment may be coupled to the message body as an emoticon, a textual description, a visual indicator (e.g., highlight, font change), a footnote, or other indicator of the sentiment. In embodiments, the compiled message may be delivered to the participants in the virtual classroom. In certain embodiments, the compiled message may be configured to only display the sentiment of the first user to the instructor of the virtual classroom (e.g., the instructor is a trusted user with respect to the first user). In this way, the instructor may make use of the sentiment of the user to assess the emotional state of the user with respect to lesson content (e.g., nervousness may indicate a lack of confidence in the user's understanding of the lesson). Other methods of using biometric-based sentiment are also possible.

Method 300 concludes at block 399. As described herein, aspects of method 300 relate to using biometric data (e.g., heart rate, body temperature, facial features, movement patterns) to dynamically (e.g., in real-time, ongoing, on-the-fly) assess the sentiment of a user and attach an indication of the sentiment to a communication. Aspects of method 300 may provide performance or efficiency benefits for communication reliability. As an example, including an indication of the sentiment of a user with respect to an electronic message may indicate how the user feels with respect to a particular topic, plan, occurrence, or event, such that a recipient of the electronic message can obtain an understanding of the intention, emotion, or attitude of the sender of the electronic message. Altogether, leveraging biometric-based sentiment assessment for a communication may be associated with content relevance, ease of understanding, and communication reliability.

Figure 4:
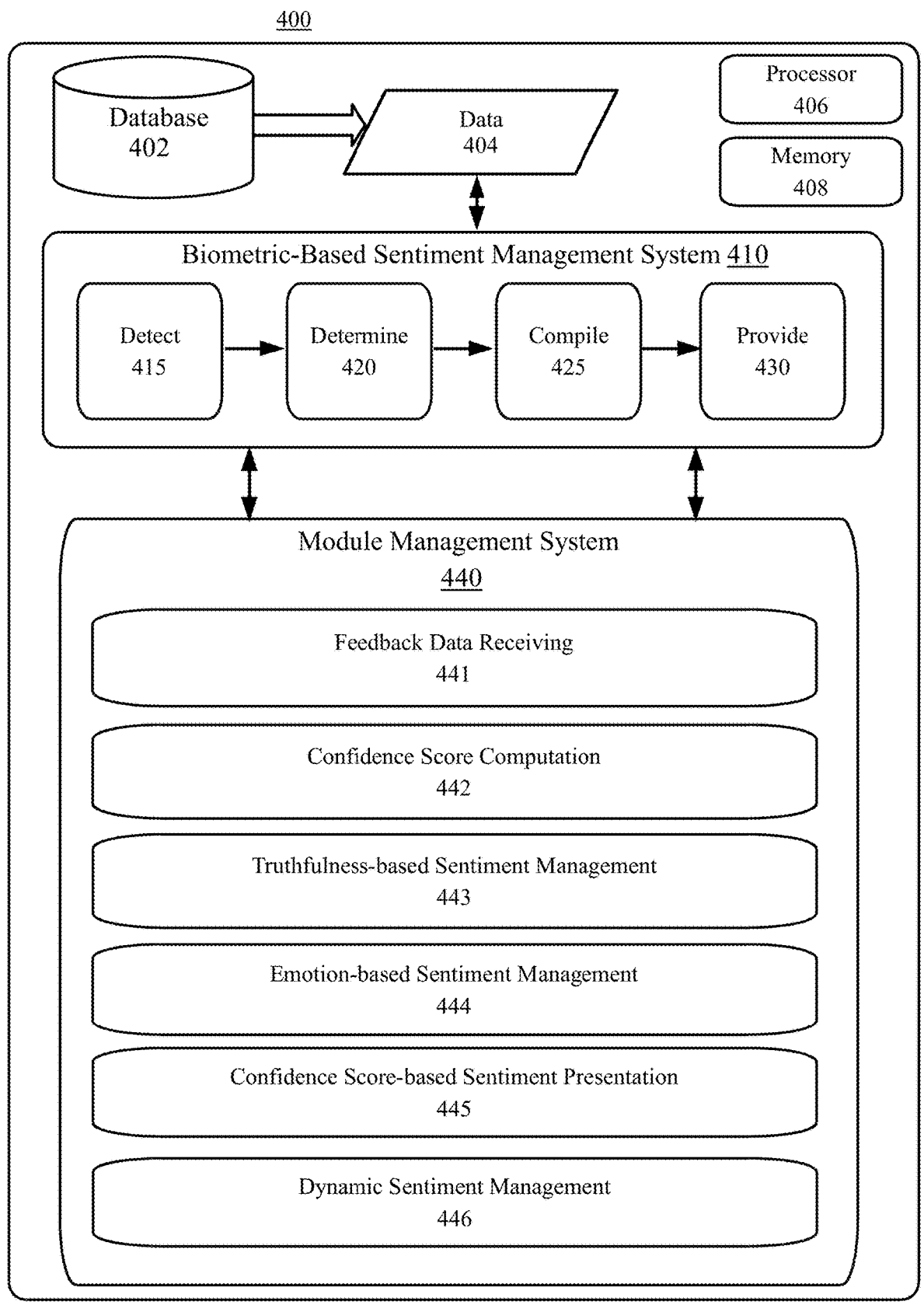
FIG. 4 shows an example system for biometric-based sentiment management in a social networking environment, according to embodiments.

FIG. 4 shows an example system 400 for biometric-based sentiment management in a social networking environment, according to embodiments. Aspects of FIG. 4 relate to using biometric data (e.g., heart rate, body temperature, facial features, movement patterns) to dynamically (e.g., in real-time, ongoing, on-the-fly) assess the sentiment of a user and attach an indication of the sentiment to a communication. The example system 400 may include a processor 406 and a memory 408 to facilitate implementation of sentiment management. The example system 400 may include a database 402 (e.g., biometry index, sentiment-emoticon database, electronic message database) configured to maintain data used for sentiment management (e.g., biometric data, sentiment data). In embodiments, the example system 400 may include a biometric-based sentiment management system 410. The biometric-based sentiment management system 410 may be communicatively connected to the database 402, and be configured to receive data 404 (e.g., electronic message, sentiment data, biometry data) related to sentiment management. The biometric-based sentiment management system 410 may include a detecting module 415 to detect a set of biometric data for an originating-user of an electronic message using a set of biometric sensors, a determining module 420 to determine an originating-user sentiment for at least a portion of the electronic message, a compiling module 425 to compile the electronic message and the originating sentiment for at least the portion of the electronic message to establish a compiled message, and a providing module 430 to provide the compiled message in the social networking environment. The biometric-based sentiment management system 410 may be communicatively connected with a module management system 440 that includes a set of modules for implementing aspects of sentiment management.

In embodiments, a set of feedback data for the compiled message may be received at module 441. The set of feedback data may be used to facilitate a set of future sentiment determinations. Generally, receiving can include collecting, acquiring, gathering, obtaining, or otherwise accepting delivery of the set of feedback data. Aspects of the disclosure, in embodiments, relate to the recognition that the collection and incorporation of feedback data may be used to refine sentiment determinations (e.g., train machine learning techniques) to facilitate the veracity and reliability of sentiment determinations. The set of feedback data may include assessments, comments, criticisms, revisions, or evaluations of the accuracy of the sentiment determined for the originating-user. In embodiments, receiving the set of feedback data may include detecting a revised sentiment for the originating-user. As an example, in a situation where a sentiment of "stressed, anxious, worried" was determined for an originating-user based on biometric data indicating an elevated heart rate, increased blood pressure, and faster walking speed, a set of feedback data may be received that indicates a revised sentiment of "excited, enthusiastic, thrilled." In embodiments, receiving the set of feedback data may include sensing a qualitative or quantitative rating of the accuracy of the determined sentiment (e.g., star rating, letter grade, percentage). Other methods of receiving the set of feedback data for the compiled message are also possible.

In embodiments, a confidence score for the originating-user sentiment for at least a portion of the electronic message may be computed at module 442. The confidence score may be computed based on the biometric analysis technique. Generally, computing can include calculating, formulating, deriving, identifying, or otherwise ascertaining the confidence score. The confidence score may include a quantitative measure, representation, or indication of the reliability, dependability, validity, or expected/predicted accuracy of the originating-user sentiment. For instance, the confidence score may be expressed as an integer between 0 and 100, where greater values indicate greater confidence and lesser values indicate lesser confidence. In embodiments, computing the confidence score may be based on the biometric analysis technique. For instance, in certain situations, the biometric analysis technique may indicate that particular biometric data factors are less conclusive than others (e.g., increased heart rate may be interpreted as excitement, nervousness, anger, fear, or a variety of other disparate sentiments). As such, sentiments derived based on biometric data indicated to be inconclusive may be assigned relatively lower confidence scores (e.g., 32). As another example, consider that a set of biometric data is collected that indicates a broad smile, low stress score, wide eyes, and increased body temperature. In embodiments, the biometric analysis technique may indicate that the collected biometric data conclusively indicates a sentiment of "happiness." Accordingly, a confidence score of "89" may be computed and associated with the originating-user sentiment. Other methods of computing the confidence score are also possible.

In embodiments, aspects of the disclosure relate to utilizing the biometric-based sentiment data for an originating-user to assess the truthfulness (e.g., honesty, accuracy, sincerity, veracity) of the electronic message at module 443. In embodiments, an originating-user may receive a permissible location (e.g., area that the originating-user is allowed to be) from a recipient user. A current location may be sensed (e.g., detected, identified) with respect to the originating-user (e.g., using global positioning techniques, user location services). By comparing the current location and the permissible location, a location match may be determined (e.g., the current location of the user substantially corresponds with the permissible location). In response to ascertaining the location match, the originating-user may receive an electronic query from the recipient-user (e.g., question or inquiry as to the location or activity of the originating-user). In advance of determining the originating-user sentiment, the electronic message from the originating-user may be captured (e.g., detected, collected, sensed) in response to receiving the electronic query (e.g., reply or response from the originating-user may be sensed). As described herein, a set of biometric data may be detected for the originating-user. In embodiments, the set of biometric data may indicate a current heart rate which exceeds a heart rate benchmark, and the compiled message may indicate that the originating-user sentiment for the response to the electric query has an untruthfulness factor which exceeds an untruthfulness threshold (e.g., the biometric data indicates that a portion of the response to the electronic query is not truthful or accurate).

Consider the following example. A middle-school student (e.g., originating-user) may receive a permissible location of a particular middle-school from his father (e.g., a recipient user) for working on a school project with a group. A current location of the particular middle school may be sensed as the current location of the middle-school student. The current location and the permissible location may be compared, and it may be ascertained that the middle-school student is at the location that he is allowed to be (e.g., the student is ostensibly at the middle-school working on the school project). In response to ascertaining the match between the current location and the permissible location, the middle-school student may receive an electronic query from his father asking "How's the project going? Are you in the middle school library working with your group?" As described herein, an electronic message from the middle-school student may be captured that states "Yeah Dad. Doing the project. Later." In embodiments, contrary to the contents of the electronic message, the middle-school student may be playing basketball with his friends in the middle-school gymnasium. A set of biometric data may be captured that indicates a current heart rate which exceeds a heart rate benchmark (e.g., heart rate of 175 beats per minute exceeding a threshold of 100 beats per minute), increased sweating, and elevated blood pressure (e.g., symptoms of moderate-to-heavy exercise). Based on the set of biometric data, the sentiment of the compiled message may indicate an untruthfulness factor (e.g., the biometric data provides reason to believe that the student is lying about doing the project). In this way, the father of the middle-school student may be aware that the middle-school student is not engaged in the project, and the reply of the middle-school student may be partially untruthful. Other methods of using the biometric data is also possible.

In embodiments, aspects of the disclosure relate to utilizing the biometric-based sentiment data to assess the emotion associated with an electronic message at module 444. In embodiments, an originating-user may receive an electronic query from a recipient user. In response to receiving the electronic query, an electronic message from the originating-user may be captured in advance of determining the originating-user sentiment (e.g., the originating-user beginning to type a response to the electronic query). In embodiments, a threshold length may exceed the actual length of the electronic message (e.g., a reply of 12 characters does not achieve a threshold length of 30 characters), and a punctuation mark (e.g., comma, ellipsis, exclamation mark, question mark, period, or the like). The compiled message may indicate that the originating-user sentiment for the response to the electronic query has a current emotion (e.g., happy, satisfied, upset) which exceeds a benchmark emotion (e.g., normal emotive state) by a threshold deviation (e.g., predetermined degree or extent) based on the actual length of the electronic message and the punctuation mark.

Consider the following example. A woman (e.g., originating-user) may receive an electronic query from her husband (e.g., recipient user) asking "So, would you like to go out for our anniversary dinner at 6:30 tomorrow night?" An electronic message from the woman may be captured that states "I work till 7 . . . ?" As described herein, the message may be below a threshold length (e.g., less than 30 characters) and have one or more punctuation marks (e.g., an ellipsis and a question mark). A set of biometric data may be captured for the woman that indicates wide, rolling eyes, flat lips, and a gesture of putting a hand to her forehead. Based on the set of biometric data, the short length of the message, and the use of punctuation, a sentiment for the woman of "exasperation, frustration" may be determined which exceeds a benchmark emotion by a threshold deviation (e.g., the woman is upset and frustrated that her husband is only making plans the day before their anniversary, and has not remembered her work schedule which she has previously communicated to him). Other methods of using the biometric data is also possible.

In embodiments, aspects of the disclosure relate to presenting a sentiment assessment for a compiled message based on a confidence value for the sentiment assessment at module 445. In embodiments, the originating-user sentiment may be assessed based on both the set of biometric data and a set of semantic elements of the electronic message. Generally, assessing can include evaluating, gauging, judging, or otherwise appraising the originating-user sentiment. Assessing the originating-user sentiment may include analyzing the biometric data for the originating-user together with the set of semantic elements (e.g., words, phrases, expressions, other data constructs that imply meaning) to ascertain whether the sentiment indicated by the biometric data and the sentiment indicated by the semantic elements match (e.g., both the biometric data and the semantic elements indicate happiness, anger, or other emotion). In embodiments, a sentiment assessment may be presented as part of the compiled message when a confidence value (e.g., 79) for the sentiment assessment exceeds a sentiment confidence value threshold (e.g., benchmark confidence criterion of 75). Generally, presenting can include displaying, providing, exhibiting, or otherwise conveying the sentiment assessment. For instance, in response to assessing the set of biometric data and the set of semantic elements and ascertaining that the sentiment expressed by each substantially corresponds to the emotion of "concerned," a confidence value of 94 may be assigned to the electronic message (e.g., independent confirmation of the sentiment data by two different methods indicates a higher likelihood of accuracy). In response to comparing the confidence value of the sentiment assessment to a sentiment confidence value threshold of 80, the sentiment assessment may be displayed together with the electronic message. Other methods of assessing and presenting the sentiment assessment are also possible.

In embodiments, the detecting, the determining, the compiling, the providing, and other steps described herein may each occur in a dynamic fashion to streamline sentiment management at module 446. For instance, the detecting, the determining, the compiling, the providing, and other steps described herein may occur in real-time, ongoing, or on-the-fly. As an example, one or more steps described herein may be performed simultaneously (e.g., the set of biometric data for the originating-user may be captured in real-time while the user composes an electronic message) in order to streamline (e.g., facilitate, promote, enhance) sentiment management. Altogether, leveraging biometric-based sentiment assessment for a communication may be associated with content relevance, ease of understanding, and communication reliability.

Figure 5:
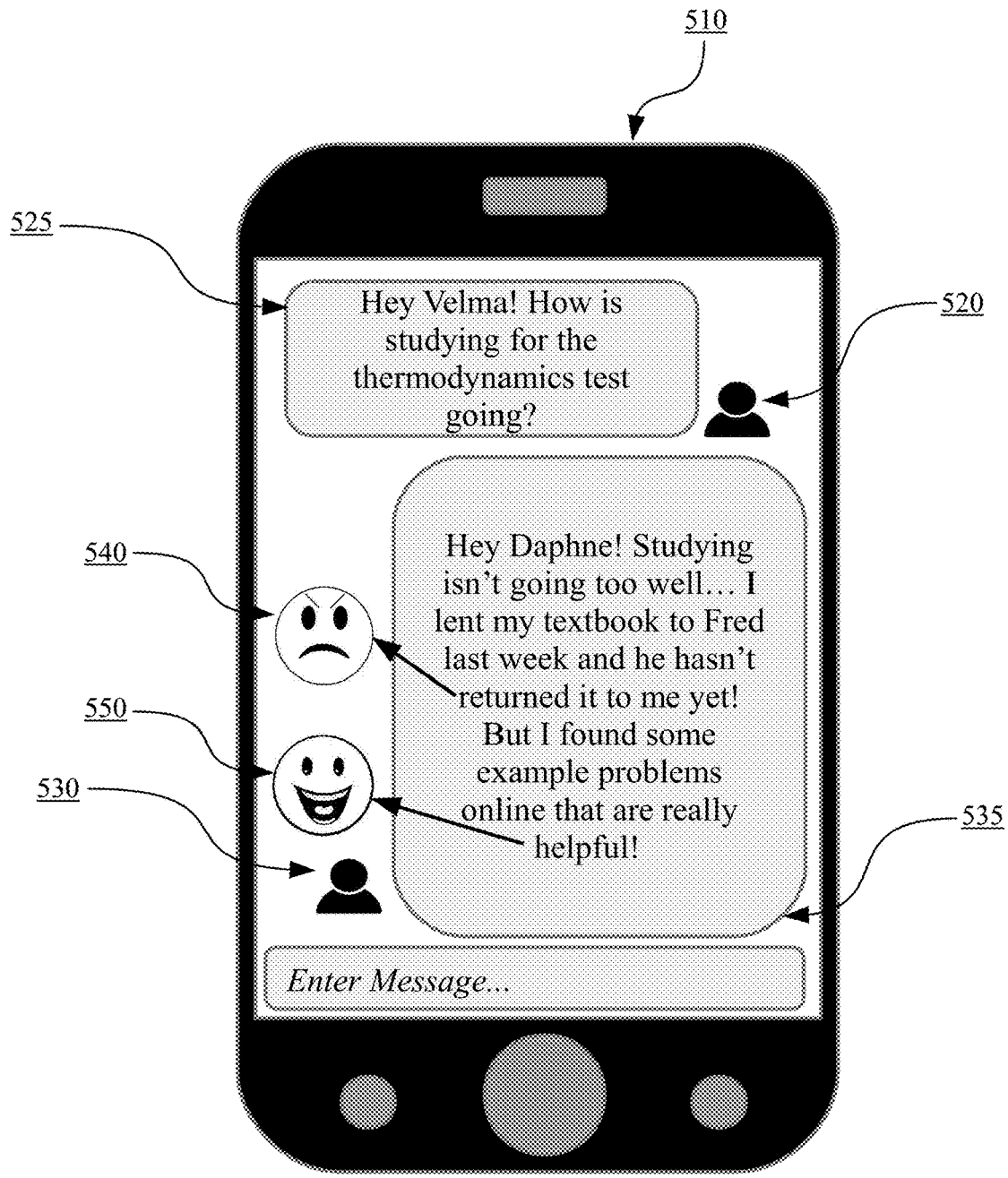
FIG. 5 illustrates an example social networking interface for biometric-based sentiment management, according to embodiments.

FIG. 5 illustrates an example social networking interface 500 for biometric-based sentiment management, according to embodiments. Aspects of FIG. 5 relate to establishing a compiled message including both an electronic message and an originating-user sentiment for at least the portion of the electronic message. As described herein, the social networking interface 500 may include mobile computing device 510 via which social networking functions (e.g., sending and receiving of electronic messages) may be performed. In embodiments, the mobile computing device 510 may be configured to facilitate sending and receiving of electronic messages between a recipient-user 520 and an originating-user 530. The recipient-user 520 may transmit an electronic query 525 to an originating-user 530. In response to the electronic query 525 of the recipient-user 520, the originating-user 530 may compose and transmit an electronic message 535. As described herein, aspects of the disclosure relate to detecting a set of biometric data for the originating-user 530, and determining an originating-user sentiment for at least a portion of the electronic message 535 based on the set of biometric data. In embodiments, a compiled message including the electronic message and the originating-user sentiment may be established and provided to the recipient-user 520. For instance, the compiled message may include a first sentiment indicator 540 and a second sentiment indicator 550 corresponding to the originating-user sentiment for different portions of the electronic message 535.

Consider the following example. The originating-user 530 may receive an electronic query 525 from the recipient user 520 inquiring as to how study is progressing for a thermodynamics test. In response to receiving the electronic query 525, the originating-user 530 may begin composing an electronic message 535. As described herein, a set of biometric data for the originating-user 530 may be detected dynamically while the electronic message 535 is being composed. For instance, while typing a first portion of the electronic message 535 of "Studying isn't going too well . . . I lent my textbook to Fred last week and he hasn't returned it to me yet," a first set of biometric data indicating a furrowed brow and downturned mouth may be detected. As another example, while typing a second portion of the electronic message 535 of "But I found some example problems online that are really helpful!" a second set of biometric data indicated wide eyes, an upturned, smiling mouth, and increased heart rate may be detected. Based on the first and second sets of biometric data, a set of originating-user sentiment factors for different portions of the electronic message 535 may be determined. For instance, based on the first set of biometric data, a first sentiment factor of "unhappy, cross, displeased" may be determined for the first portion of the electronic message 535, and a second sentiment factor of "happy, excited, pleased" may be determined for the second portion of the electronic message 535 based on the second set of biometric data. Using the determined set of sentiment factors, a compiled message may be established that includes the electronic message 535 as well as the set of originating-user sentiment factors. In embodiments, establishing the compiled message may include attaching one or more sentiment indicators (e.g., markers, tags, highlighting, font, emoticons) to the electronic message 535. For instance, for the first sentiment factor, a first sentiment indicator 540 including an unhappy face emoticon may be identified and coupled with the first portion of the electronic message 535. For the second sentiment factor, a second sentiment indicator 550 including a smiley face emoticon may be identified and coupled with the second portion of the electronic message 535. As described herein, the compiled message (e.g., the electronic message 535 together with the first sentiment indicator 540 and the second sentiment indicator 550) may be provided to the recipient-user 530. Other methods of biometric-based sentiment management in a social networking environment are also possible.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

What is claimed is:

1. A computer-implemented method for biometric-based sentiment management in a social networking environment, the method comprising:
   detecting, using a set of biometric sensors, a set of biometric data for an originating-user of an electronic message;
   determining, based on the set of biometric data, an originating-user sentiment for at least a portion of the electronic message;
   composing the electronic message and the originating-user sentiment for at least the portion of the electronic message, wherein composing the electronic message and the originating-user sentiment comprises:
      modifying content of the electronic message to only include the portion of the electronic message associated with the originating-user sentiment, and
      establishing the portion of the electronic message and associated sentiment together in a single data package; and
   providing, in the social networking environment, the composed message which indicates the originating-user sentiment for at least the portion of the electronic message.

2. The method of claim 1, further comprising:
   analyzing, in a dynamic fashion, the set of biometric data using a biometric analysis technique to determine the originating-user sentiment.

3. The method of claim 2, further comprising:
   attaching, in an automated fashion, a sentiment indicator to the electronic message to compose the message.

4. The method of claim 2, further comprising:
computing, based on the biometric analysis technique, a confidence score for the originating-user sentiment for at least the portion of the electronic message.

5. The method of claim 3, further comprising:
introducing, in the automated fashion based on the originating-user sentiment, an emoticon to the composed message.

6. The method of claim 3, further comprising:
displaying the sentiment indicator in the social networking environment, wherein the sentiment indicator includes a confidence score for the originating-user sentiment for at least the portion of the electronic message.

7. The method of claim 1, wherein the set of biometric data comprises a heart rate, a blood pressure, a stress score, a pupil dilation, a glucose value, a body temperature, a movement speed, a movement frequency, a set of fingerprint information, a set of facial features, and a set of body language information.

8. The method of claim 1, further comprising:
analyzing, to determine the originating-user sentiment with respect to the electronic message, the set of biometric data using a machine learning technique configured for the originating-user.

9. The method of claim 1, further comprising:
analyzing, to determine the originating-user sentiment with respect to the electronic message, the electronic message using a natural language processing technique configured for the originating-user.

10. The method of claim 1, further comprising:
identifying a trusted relationship between the originating-user and a recipient-user by connecting to a social media network environment and determining that the originating-user and the recipient-user are registered as mutual friends, wherein the trusted relationship indicates the recipient-user is authorized to view the originating-user sentiment.

11. The method of claim 10, wherein providing, in the social networking environment, the composed message which indicates the originating-user sentiment for at least the portion of the electronic message includes:
transmitting the composed message from the originating-user to a recipient-user.

12. The method of claim 11, further comprising:
receiving, from the recipient-user, a set of feedback data for the composed message to facilitate a set of future sentiment determinations.

13. The method of claim 11, further comprising:
receiving a permissible location for the originating-user from the recipient-user;
sensing a current location of the originating-user;
comparing the current location of the originating-user to the permissible location;
receiving an electronic query from the recipient-user to the originating-user in response to ascertaining the current location of the originating-user matches the permissible location; and
comparing the biometric data of the originating-user to the content of the electronic message to determine inconsistencies indicating a truthfulness of the electronic message in advance of determining the originating-user sentiment,
wherein the electronic message constitutes a response by the originating-user to the recipient's query, wherein the set of biometric data indicates a current heart rate which exceeds a heart rate benchmark based on the content of the electronic message, and wherein the electronic message indicates that the originating-user sentiment for the response to the electronic query has an untruthfulness factor which exceeds an untruthfulness threshold.

14. The method of claim 11, further comprising:
receiving an electronic query from the recipient-user to the originating-user; and
capturing, from the originating-user in response to receiving the electronic query, the electronic message in advance of determining the originating-user sentiment, wherein a threshold length exceeds an actual length of the electronic message, wherein the electronic message includes a punctuation mark, and wherein the composed message indicates that the originating-user sentiment for a response to the electronic query has a current emotion which exceeds a benchmark emotion by a threshold deviation based on both the actual length of the electronic message and the punctuation mark.

15. The method of claim 11, further comprising:
assessing, based on both the set of biometric data and a set of semantic elements of the electronic message, the originating-user sentiment; and
presenting, in an automated fashion, a sentiment assessment as part of the composed message when a confidence value for the sentiment assessment exceeds a sentiment confidence value threshold.

16. A computer-implemented method for biometric-based sentiment management in a social networking environment, the method comprising:
detecting a set of biometric data for an originating-user of an electronic message using a set of biometric sensors;
determining an originating-user sentiment for at least a portion of the electronic message based on the set of biometric data;
truncating the electronic message to only include the portion of the electronic message associated with the originating-user sentiment,
bundling the truncated portion of the electronic message and associated originating-user sentiment together in a single data package; and
providing, in the social networking environment, the bundled message which indicates the originating-user sentiment for at least the portion of the electronic message.

17. The method of claim 16, further comprising:
identifying a trusted relationship between the originating-user and a recipient-user by connecting to a social media network environment and determining that the originating-user and the recipient-user are registered as mutual friends, wherein the trusted relationship indicates the recipient-user is authorized to view the originating-user sentiment.

18. A computer-implemented method for biometric-based sentiment management in a social networking environment, the method comprising:
detecting a set of biometric data for an originating-user of an electronic message using a set of biometric sensors, wherein the set of biometric data comprises a pupil dilation, a glucose value, a body temperature, a set of facial features, and a set of body language information;
determining an originating-user sentiment for a portion of the electronic message based on the set of biometric data;
truncating the electronic message to only include the portion of the electronic message associated with the originating-user sentiment, bundling the truncated portion of the electronic message and associated sentiment together in a single data package; and providing, in the social networking environment, the bundled message which indicates the originating-user sentiment for at least the portion of the electronic message.

19. The method of claim 18, further comprising:

identifying a trusted relationship between the originating-user and a recipient-user by connecting to a social media network environment and determining that the originating-user and the recipient-user are registered as mutual friends, wherein the trusted relationship indicates the recipient-user is authorized to view the originating-user sentiment.

\* \* \* \* \*